UNITED STATES PATENT OFFICE.

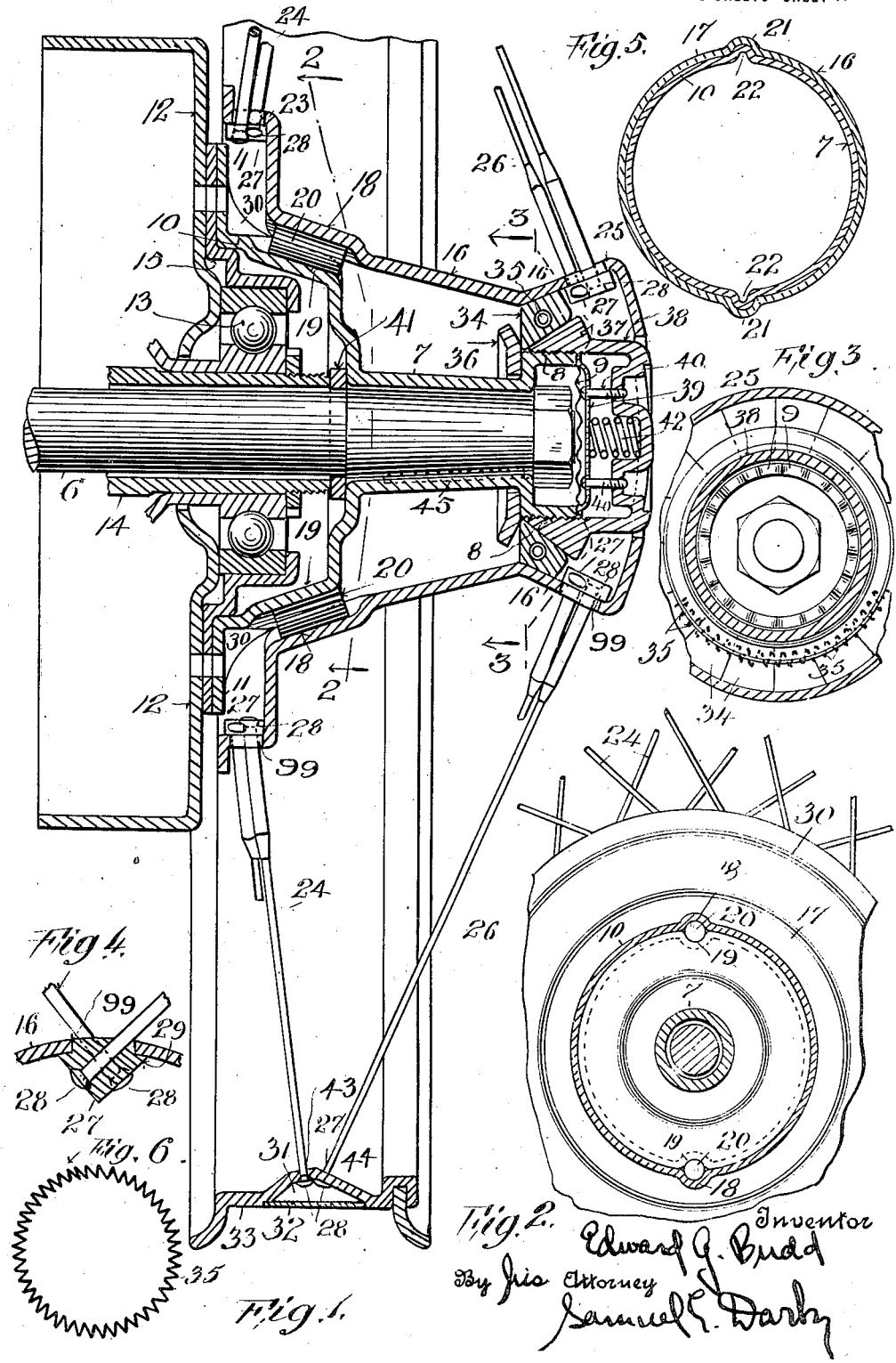

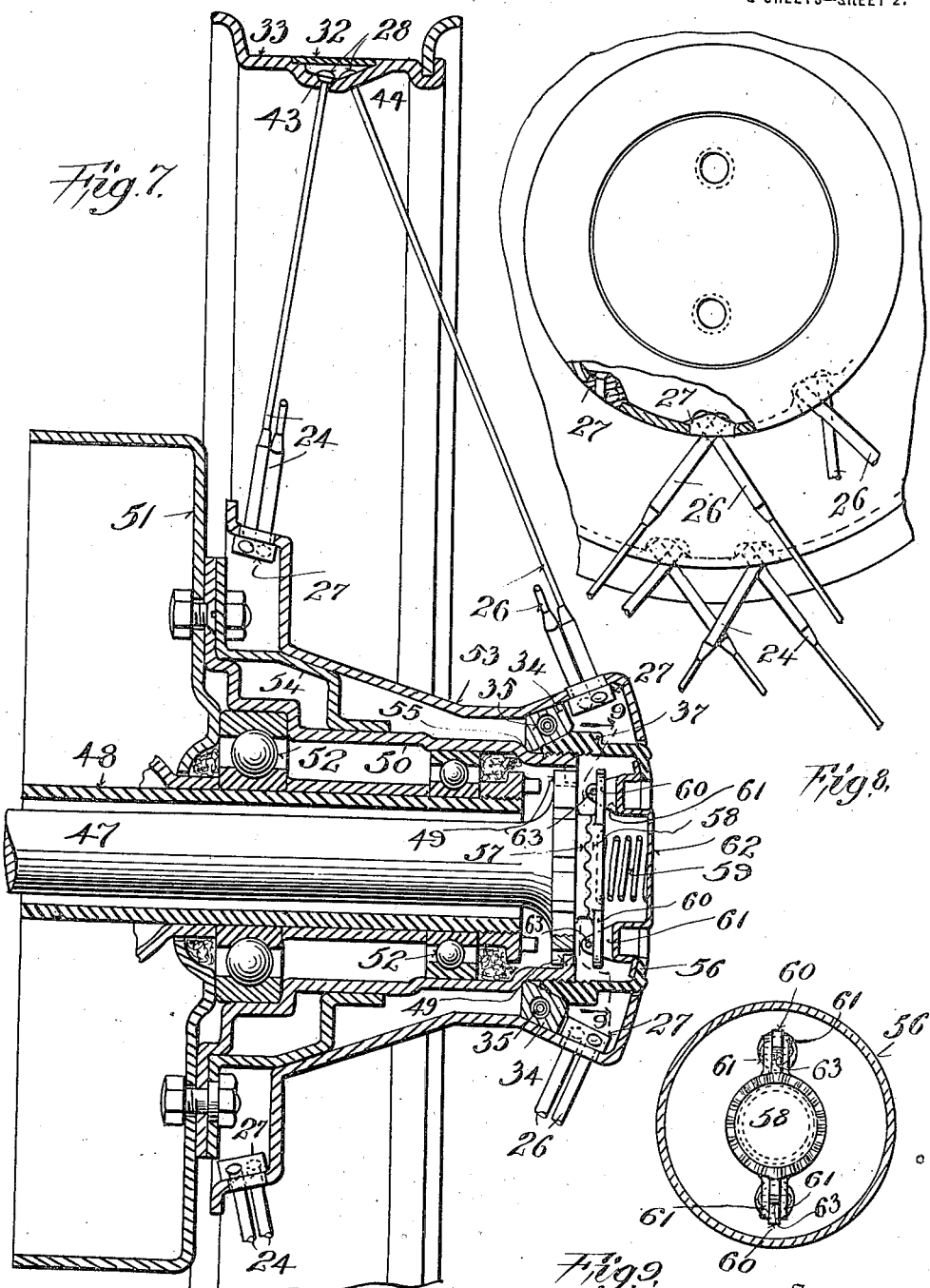

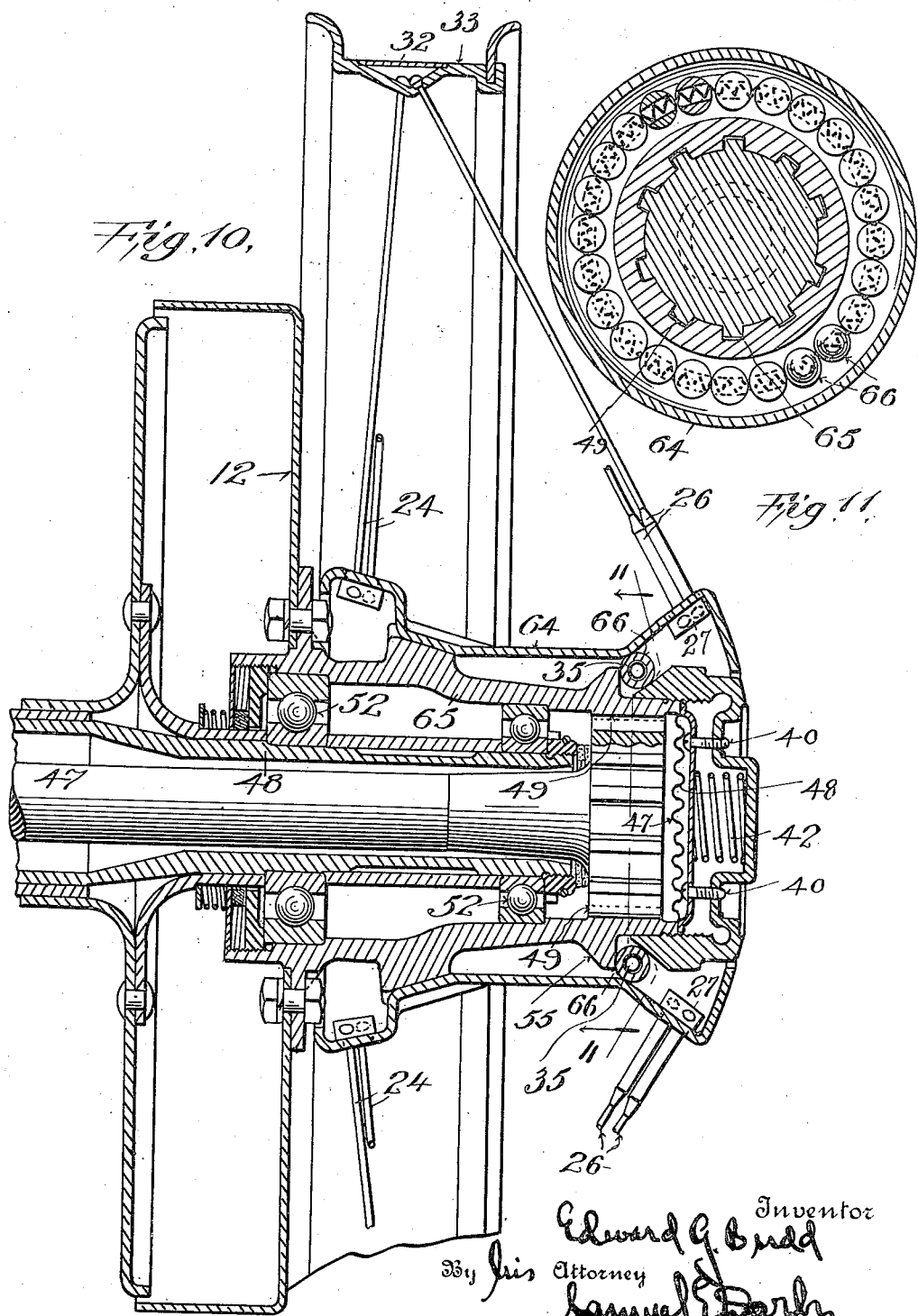

EDWARD G. BUDD, OF PHILADELPHIA, PENNSYLVANIA, ASSIGNOR TO BUDD WHEEL CORPORATION, OF PHILADELPHIA, PENNSYLVANIA, A CORPORATION OF VIRGINIA.

DETACHABLE WIRE-SPOKED WHEEL.

1,299,400.  Specification of Letters Patent.  Patented Apr. 1, 1919.

Application filed July 19, 1916. Serial No. 110,112.

*To all whom it may concern:*

Be it known that I, EDWARD G. BUDD, a citizen of the United States, residing at Philadelphia, in the county of Philadelphia, State of Pennsylvania, have made a certain new and useful invention in Detachable Wire-Spoked Wheels, of which the following is a specification.

This invention relates to detachable wire spoked wheels.

The object of the invention is to provide a hub structure for wire spoked wheels which is simple, economical to manufacture, and efficient in operation.

A further object of the invention is to provide a hub structure for wire spoked wheels having means to afford a straight-away connection of the wire spokes between the hub and rim.

A further object of the invention is to provide a hub structure which is simple, economical and efficient, and wherein means are provided for coupling the sleeve parts of the hub for coincident rotation.

A further object of the invention is to provide means for efficiently strengthening the parts of the hub.

A further object of the invention is to provide means for connecting the spokes to the rim in such manner as to avoid contact between the spoke ends and a tire or shoe seated in the rim.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claim.

Referring to the accompanying drawings—

Figure 1 is a view in central longitudinal section of a wire spoked wheel and one form of hub structure therefor, embodying the principles of my invention.

Fig. 2 is a view in section on the line 2, 2, Fig. 1, looking in the direction of the arrows.

Fig. 3 is a similar view on the line 3, 3, Fig. 1, looking in the direction of the arrows.

Fig. 4 is a detail view in section showing a means for securing the ends of the spokes to the hub.

Fig. 5 is a view in section through the hub sleeves showing a slightly modified means for connecting the sleeves to rotate together and embodying my invention.

Fig. 6 is a detached detail view showing a form of expansible connection for retaining in position the devices employed to clamp the detachable wheel upon the hub.

Fig. 7 is a view similar to Fig. 1 showing a hub structure slightly modified in some of its details and embodying my invention, and applied to a full floating axle type of axle and wheel unit.

Fig. 8 is a view in end elevation of the structure shown in Fig. 7, parts broken out and parts in section.

Fig. 9 is a detail view in section on the line 9, 9, Fig. 7, looking in the direction of the arrows.

Fig. 10 is a view similar to Fig. 1, showing another modified structure of hub for wire spoked wheels embodying my invention.

Fig. 11 is a view in section on the line 11, 11, Fig. 10.

The same part is designated by the same reference numeral wherever it occurs throughout the several views.

In the construction of wire spoked wheels it is desirable to employ sets of wire spokes to connect the hub and rim of the wheel and which spokes are inclined to the central plane of the wheel and are also connected tangentially to the hub.

In order to secure the proper inclination of the spokes it has been customary, and, indeed, necessary in the case of tangential spokes, to bend the spokes at their ends, particularly where the spokes pass through and are anchored to the hub sleeve, thus securing a more or less radial connection of the spoke ends to the hub, while the bodies of the spokes are inclined from the hub toward the rim and to the central plane of the wheel. This arrangement is undesirable and objectionable because of the resulting danger of the spokes becoming ruptured or broken where bent at their point of connection with the hub, under the influence of the strains to which such spokes are subjected. It is among the special purposes of my present invention to provide for the inclined relation of spokes above referred to, all spokes being tangential, and at the same time avoiding any bends throughout the length of the spokes. It is also among the special purposes of my invention to provide a hub structure which is exceedingly simple and economical to manufacture, wherein an efficient driving connection between the hub sleeves is secured without interfering with the easy detachment or replacement of the wheel upon its axle hub, and wherein the cooperating surfaces of the hub sleeves may be shaped into trued engaging relation with respect to each other, thereby greatly reducing the cost of manufacture of these parts.

Another special feature of my invention resides in the provision of means to prevent the ends of the spokes which extend through and connect to the rim from coming into contact with the tire or shoe seated in the rim.

Other special features of my invention will be explained hereinafter.

Referring to the drawings, and particularly to the structure shown in Fig. 1. 6 designates a vehicle axle upon which is mounted a hub sleeve 7. This sleeve is in the form of a shell, the outer end of which is exteriorly threaded, as indicated at 8, the end surface thereof being fluted or corrugated, as indicated at 9. The inner end of hub sleeve 7, is formed into an enlarged exteriorly inclined or cone shaped portion 10, which portion, at its larger diameter in this particular instance terminates in a radial flange 11, for attachment to the brake wheel 12. If desired a ball bearing 13 may be interposed between the brake wheel and the axle 6, or the sleeve 14 through which the axle extends. A retaining flange 15 for the ball bearing may be provided with a radial portion and interposed between the web of the brake wheel and the radial flange 11, of the hub sleeve 7. These details, however, are unimportant so far as my present invention is concerned. The wheel hub sleeve member is designated by reference numeral 16, and is designed to telescope over the hub sleeve 7. The wheel hub sleeve 16 is provided with an annular inclined or conical portion or surface 17, complementary to the cone shaped surface 10 of sleeve 7, and adapted to be seated thereon when the wheel is placed in position on the axle hub. Various means may be employed to secure the driving connection between the sleeves 16 and 7.

In Figs. 1 and 2, one arrangement is shown wherein coöperating seats 18—19, are formed in pairs at diametrically opposite points in the cone surfaces 10—17, to receive locking pins 20. Any desired number of pairs of these locking devices may be employed. While, therefore, I have shown only one pair of such devices I do not desire to be limited or restricted thereto. Instead of employing locking pins 20 for locking the sleeves 7 and 16, in driving engagement, the complementary seats 18—19, formed in the sleeves 7 and 16, may themselves interlock together as indicated at 21, 22, see Fig. 5. In some cases I prefer the arrangement shown in Figs. 1 and 2, however, for the reason that the complementary cone surfaces of the sleeves 7—16, in the arrangement therein shown, with the complementary seats 18, 19, therein, are more easily produced in the operation of forming the cone sleeves thereby greatly facilitating the manufacture of the parts, and securing accurate and true coöperating cone seating surfaces when pressed out in dies.

In the form of my invention shown in Fig. 1, the inner enlarged end of the wheel hub member 16 is formed into an annular flange 23, to which the hub ends of the inner spokes 24 are secured. The outer end of the wheel hub member 16 is pressed into an annular inclined portion 25, which is exteriorly inclined in reverse direction to the general inclination of the inner portion of said sleeve. The hub ends of the outer spokes 26 of the wheel are anchored in this annular flared portion of the hub member 16. In practice it is desirable that the spokes 26 be inclined at an angle to the center plane of the wheel rim, while also being tangentially connected to the hub. To permit the employment of this arrangement of spokes, and at the same time afford a straight away lead to the spokes from end to end without bending them at their point of connection to the hub I provide the hub member 16 with perforations 99 in which are seated inwardly projecting blocks 27, through which blocks the straight spokes pass, the inner ends of the spokes being suitably shouldered or headed as indicated at 28, to engage the inner inclined surfaces of the block 27, preferably in countersunk seats to receive said shouldered ends. This block is shouldered as at 29 to bear against the metal of the flange portion of hub sleeve member 16, surrounding the opening 99 into which the block 27 extends and is secured. This affords a very simple and efficient anchorage connection for the spokes, permitting them to be connected without bends respectively to the hub member 16 and to the rim.

The same structure may also be employed to anchor the hub ends of the inner sets of spokes 24 thereby permitting said spokes to be inclined to the center plane of the wheel and also to be tangential to the wheel hub, and still be without bend therein at their point of connection or anchorage to the hub.

In order to effectively strengthen the hub sleeve 7 where it is secured to the brake wheel 12, I form gussets or webs 30 in the sleeve 7, at the junction of the radial flange portion 11 thereof with the body of said sleeve. These webs serve to strengthen the structure and reinforce the same.

In order to prevent the ends of the spokes which project through and are anchored to the rim from coming in contact with a tire or shoe seated in the rim I provide the rim with a centrally depressed channel 31, into which channel the rim ends of the spokes project. I close the channel by means of a band 32, which is seated in a groove in and lies flush with the exterior surface of the rim 33, thereby leaving the exterior surface of the rim smooth and free to receive a tire, shoe, or the like. This arrangement also avoids the necessity of grinding off the ends of the spokes after the wheel is assembled and which adds to the expense of manufacture. In order to secure the spokes to the rim in such manner as to avoid bends where the blocks 27 are not used the portions of the rim to which the spokes are connected are pressed into the angular portions 43, 44, which are at right angles to the lengths of the spokes.

When the outer hub sleeve 16 is placed in position on the inner hub 7, it is detachably retained thereon. Any suitable structure for detachably clamping the sleeve 16 in place may be employed. A simple arrangement is shown wherein relatively expansible members such as wedge blocks 34, coöperate with the inner inclined surface of the outwardly flared or annular portion 25, of sleeve 16, to accomplish the clamping function. These wedge blocks or members may be retained in position in any convenient manner, as, for example, by an expansible resilient member 35 threading through them. A backing for the wedge blocks is afforded by means of a flange 36, welded or otherwise secured or mounted upon the inner hub member 7. The wedge blocks 34 are forced outwardly or relatively expanded into clamping engagement with the annular portion 25 of sleeve 16, by means of a wedging portion 37, on a screw cap 38, which is screwed onto the exteriorly threaded end portion 8 of sleeve 7. When the screw cap has been turned up to accomplish the clamping and wedging action of blocks 34, it is desirable to prevent said screw cap from becoming accidentally backed off. Any simple arrangement may be employed for this purpose. A simple arrangement is shown wherein the cap 38 carries a spring washer or plate 39, the peripheral edges of which are fluted to frictionally engage and bear against the fluted end surface 9 of sleeve 7. The spring plate 39 may be held to rotate with the screw cap in any convenient manner, as, for instance, by means of the studs 40. A spring 42 is interposed between the end wall of the screw cap 38, and spring plate 39 to press the latter, or its fluted peripheral edge, into frictional contact with the fluted end surface 9, of sleeve 7. This affords a very simple structure of friction engagement, the friction of which is sufficient to retain the cap 38 against accidental backing off, while at the same time avoiding the objection arising from the use of a lock which is positive in action and which therefore requires positive release before the screw cap may be rotated. In my structure I am enabled to rotate the screw cap to effect the clamping of the wheel and also to permit the wheel to be released for demounting without the necessity for preliminarily releasing a lock, the friction of the engaging surfaces of the spring plate or member 39 and the fluted hub end surface 9 being sufficient to retain the screw cap from being accidentally backed off while permitting the same to be backed off at any time when required.

A collar 41 of felt or other suitable material may be employed to exclude dust, dirt or the like from the axle bearing. In order to remove the wheel the cap 38 is backed off from the threaded end of sleeve 7, a small distance, or entirely thereby allowing the wedge blocks or members 34 to release sleeve 16. Said sleeve, and with it the spokes and rim, may then be slipped off from sleeve 7, and repaired, renewed or replaced by another wheel which when applied to the sleeve 7, is clamped and retained in place by again turning up on the screw cap 38, and wedging the blocks or members 34, into clamping engagement with the hub sleeve 16.

In Fig. 1 I have shown my invention as applied to a driving wheel, the axle sleeve 7 being keyed to the axle, as indicated at 45. It is obvious, however, that the same principles may be applied with equal facility to a full floating axle structure, or to non-driven or front wheels of motor vehicles. Thus, in Figs. 7, 8, and 9, I have shown my invention, with certain modifications in details, applied to a full floating axle type of structure. In this case the axle 47 extends through the stationary sleeve 48 and is gear connected, in any suitable manner, as for instance through the gear teeth 49, with the hub sleeve 50, the latter, together with the brake wheel 51, being journaled to rotate upon the sleeve 48, preferably with the interposed ball bearings 52. The wheel hub sleeve 53 in this case corresponds to the sleeve 16 in the structure shown in Fig. 1. In the case of Fig. 7, however, I have shown a slightly different arrangement for connecting the sleeve 53 to rotate with sleeve 50, and wherein the sleeve 53 is fitted upon the interposed sleeve member 54. In this form I also dispense with the retaining flange 36 for the wedge members 34, and form a shoulder 55 in the sleeve 50 to accomplish the same function.

A slightly different arrangement of friction retaining means for the clamp nut or screw cap 56 is shown in Figs. 7 and 9, wherein the fluted surface 57 is carried by the axle 47, and is engaged by a correspondingly fluted friction member 58, which is yieldingly pressed into engagement therewith by spring 59, said member 58 having extensions 60, engaging between ears 61, stamped out of a member 62, carried by the screw cap 56. The friction member 58 is retained in place by means of pins 63, carried by the ears 62.

In Figs. 10 and 11 I have shown another form of hub structure embodying my invention applied to a floating axle type of drive wheel, and wherein the wheel hub sleeve 64, is mounted directly upon and rotates with the permanent hub sleeve 65, the latter being geared to the axle, in the case of a floating axle. In the form of device shown in Figs. 10 and 11, the wedge block clamping members 34 of the previously described structures are replaced by round balls 66, which are held in place by the resilient expansible member 35, and a retaining shoulder 55 on hub sleeve 65.

While I have shown various forms of clamping devices for detachably retaining the wire wheel structure upon the axle hub, and also various forms of frictional retaining means for cap screw I do not claim all of said structures herein as they do not constitute my present invention, and, moreover, various other specific forms of devices in respect to these features may be employed in connection with my invention, and many other variations and changes in details of structure may be made without departure from the spirit and scope of my invention. I do not desire, therefore, to be limited or restricted to the exact details shown and described, but having now set forth the objects and nature of my invention, and various constructions embodying the principles thereof, what I claim as new and useful, and of my own invention, and desire to secure by Letters Patent, is:—

In a wire spoked wheel structure, an inner hub sleeve and an outer hub sleeve, means for detachably clamping the latter to the former, including a screw cap for the threaded end of the inner hub sleeve, said inner hub sleeve having a fluted end surface, studs carried by said cap, and a spring pressed plate having a correspondingly fluted edge to coöperate with the fluted end surface of the inner hub sleeve, said plate being carried loosely by said studs to rotate with said cap.

In testimony whereof I have hereunto set my hand, in the presence of the subscribing witnesses, on this 10th day of July, A. D. 1916.

EDWARD G. BUDD.

Witnesses:
JOSEPH LEOTROINKO,
A. H. BUXBAUM.